May 16, 1944.   G. J. SHEEHY   2,348,858
COMBINED AXIOMETER AND BIFOCAL LENS SEGMENT LOCATER
Filed Jan. 9, 1942   2 Sheets-Sheet 1

Inventor
GEORGE J. SHEEHY

By  W. S. McDowell
Attorney

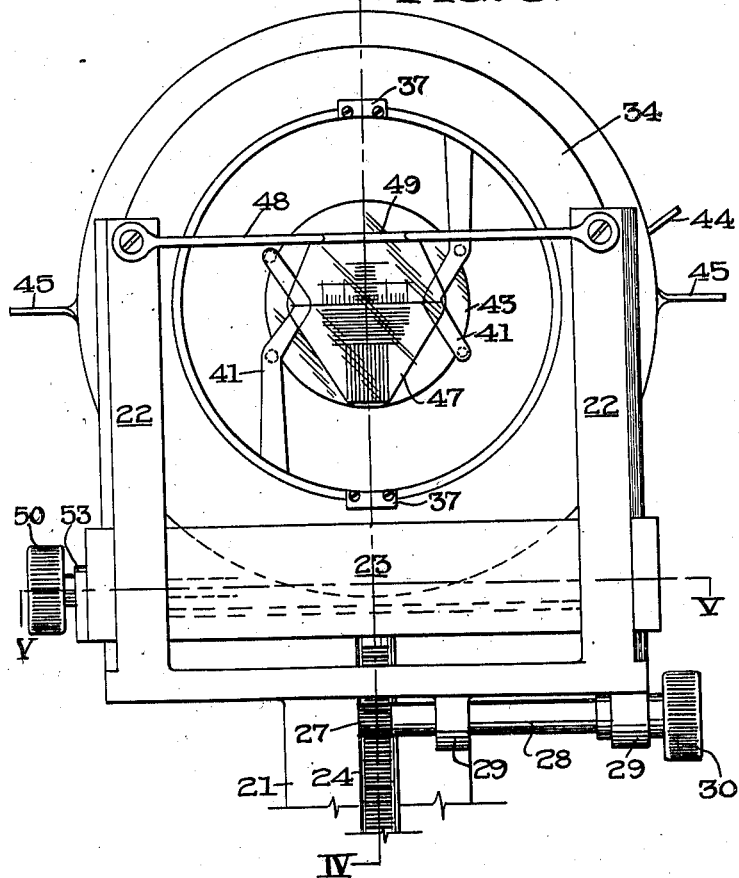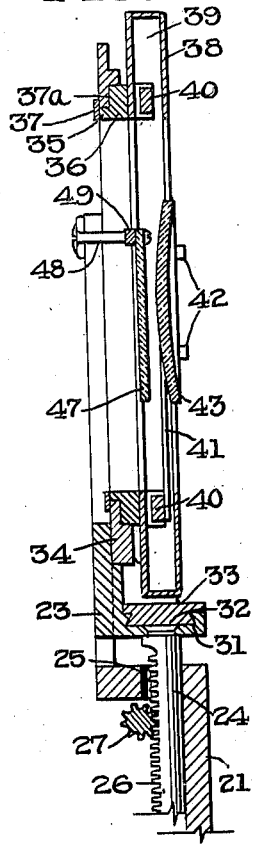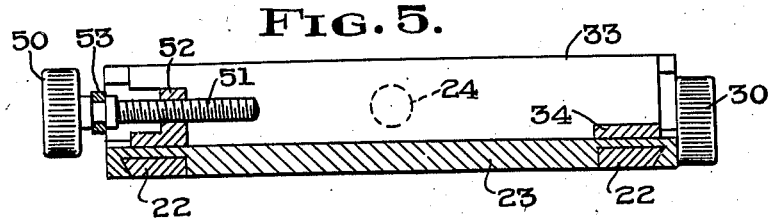

Patented May 16, 1944

2,348,858

UNITED STATES PATENT OFFICE 2,348,858

COMBINED AXIOMETER AND BIFOCAL LENS SEGMENT LOCATER

George J. Sheehy, Columbus, Ohio

Application January 9, 1942, Serial No. 426,175

3 Claims. (Cl. 33—174)

This invention relates generally to apparatus for finishing lenses used in the construction of eyeglasses, spectacles and the like. More specifically, the invention relates to improvements in instruments employed in centering, locating and marking lenses preparatory to cutting, edging and mounting the same, particularly lenses of the bifocal type.

At the present time, many instruments are available for use in locating and marking the optical axes and centers of lens blanks. Other machines have also been proposed for locating and marking lenses of the bifocal type relative to the "drop" and "inset" of the segments therein. Such machines have been characterized by their complications and the inconvenience and delay incident to their use. There has never been, to my knowledge, a simple, economic and easily operated testing device for finding the optical axis and center of a finished bifocal lens and locating the segment relative to the "drop" and "inset" without requiring the lens to be removed from the instrument or moved by hand therein without due regard to the accuracy of the movement.

For instance, bifocal lenses are frequently tested in a customary axiometer to find the optical axes and centers and then removed and arranged adjacent to a protractor to locate the longitudinal axes of the finished lenses relative to the reading segments, the lenses being manually held over or in front of the protractor and moved up or down and laterally the distances specified in the prescription for the "drop" and "inset." Such a method of performing these operations is apt to produce errors in the finished lenses unless the operator is highly skilled and even then, considerable time and care must be expended with a consequent increase in the cost of the lenses.

One of the primary objects of the invention resides in the provision of an instrument by means of which a bifocal lens blank may be tested to find the axis and optical center thereof and adjusted in a controlled manner and direction to accurately determine the "drop" and "inset" of the reading segment, all the adjustment being mechanically made under the complete control of the operator.

Another object of the invention resides in the provision of a lens centering and marking instrument having a sighting piece and a target disposed in spaced relation with a lens receiving and supporting device therebetween, the latter device being composed of a plurality of parts so connected that a lens mounted thereon may be rotated to find the axis and optical center and then moved in predetermined paths to effect adjustment thereof relative to a fixed gauge or protractor whereby the reading segment of the lens will be located according to a prescription, after which a marking device may be operated to apply marks to the lens to indicate the mechanical axis from which the final edge of the finished lens will be located.

Other objects will be apparent from the following description and the accompanying drawings in which the invention has been illustrated in one of its preferred forms.

In the drawings,

Fig. 3 is a rear elevational view of the holding device shown in Fig. 2;

Fig. 4 is a vertical transverse sectional view taken on the plane indicated by the line IV—IV of Fig. 3;

Fig. 5 is a detail horizontal sectional view taken on the plane indicated by the line V—V of Fig. 3.

Figure 1:
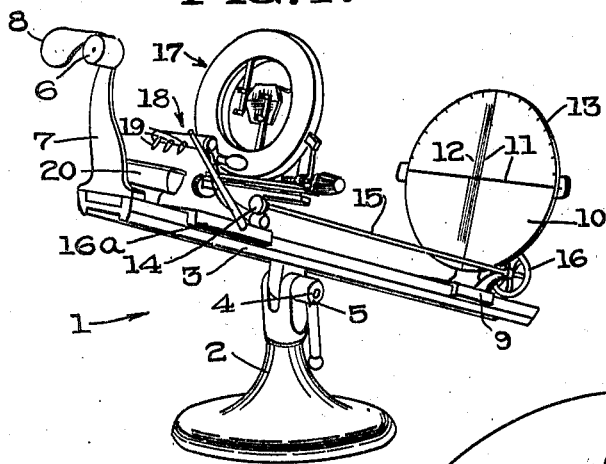
Fig. 1 is a perspective view of an instrument formed in accordance with the present invention.

Referring more particularly to the drawings, the numeral 1 designates the instrument in its entirety. This instrument is similar to the customary axiometer, the invention being directed primarily to the lens receiving and supporting portion thereof. The device includes a pedestal 2 on the upper end of which is mounted a longitudinally extending bed 3, this member being supported on the pedestal for adjustment about a horizontal axis 4 and maintained in this adjustment through the use of a clamping nut 5. At one end of the bed 3, there is positioned the customary eye piece 6 which is supported above the bed on a bracket 7. A shield 8 is disposed adjacent to the eye piece to block the vision of one eye of the user.

At the opposite end of the bed, there is supported on an adjustable bracket 9 a disk 10 having cross lines 11 and a plurality of vertically extending gauge lines 12. The periphery of the disk is also provided with circumferentially spaced marks 13 by means of which the degree of turning movement of the disk may be determined in comparison to a stationary mark provided on a part of the machine adjacent to the edge of the disk. Rotary movement is imparted to the disk by turning a knob 14 fixed to one end of a shaft 15 extending longitudinally of the bed and having motion transmitting means 16 at the end adjacent to the disk. Between the eye piece and the disk-like target, the bed adjustably supports a carriage 16a on which the lens receiving and supporting mechanism designated generally by the numeral 17 is mounted. In front of this mechanism, the carriage is provided with a marking device 18 which is positioned on the carriage for swinging movement about a horizontal axis to apply marks to a lens held in the mechanism 17.

The marking device has a plurality of points 19 for engaging the lens blanks, these points being also engaged with an ink roll or similar member 20 upon return of the marking device to an inactive position. Mechanism is provided on the marking device to rotate the pointer supports so that when the device is moved toward the lens, the pointers will contact therewith and when the device is moved to an inactive position, the pointers will be directed toward the inking pad or roller.

The mechanism thus far described is of the usual type and a further description thereof is believed to be unnecessary.

Figure 2:
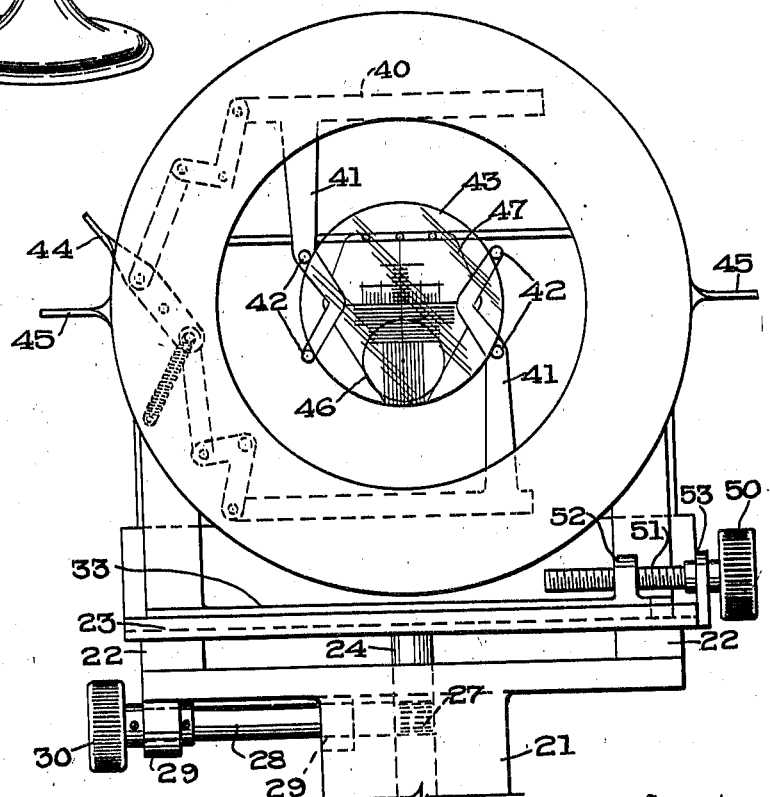
Fig. 2 is a front elevational view of the lens receiving and supporting apparatus of the instrument.

As illustrated in Figs. 2, 3 and 4, the lens supporting mechanism includes an upwardly directed stand 21 which is integrally formed with the carriage and has a pair of spaced guide bars 22 extending vertically therefrom. These bars have angularly arranged finished surfaces for engagement with complemental surfaces of grooves formed in one section 23 of the frame forming a part of the lens holding mechanism.

Due to the arrangement of the frame in the guides of the member 21, the former may be moved up and down with respect to the carriage. To effect such movement, a rod 24 is fixed to the first section of the frame and projected through an opening 25 provided in the carriage 21. One side of the rod 24 has rack teeth 26 formed thereon for meshing engagement with similar teeth formed on a pinion 27. This member is carried at one end of a shaft 28 journaled for rotary movement in bearings 29 depending from a horizontally extending portion of the carriage. The outer end of the shaft 28 has a control knob 30 secured thereto, the rotation of this knob serving to impart longitudinal movement to the rod 24 which in turn transmits such movement to the frame. There is sufficient friction between the bearings 29 and the shaft 28 to hold the frame in its various positions of adjustment.

The portion 23 of the frame is also formed as indicated in Fig. 4 by the numeral 31 with a horizontally extending dovetail guideway for the reception of a similarly shaped boss 32 formed with a second section 33 of the frame. The latter section has an upwardly projecting body portion 34 which is substantially ring-like, having a circular opening for the reception of the reduced extension 35 of another ring-like plate 36. The extension 35 has a plurality of small plates 37a secured thereto on one side of the body 34 to retain the plate 36 in assembled relation with the body 34. The plate 36 also has a shoulder 37 for engagement with the body 34 to provide for swiveling movement of the plate 36 in the circular opening of the body 34. The plate 36 serves to connect a lens chuck support 38 to the body 34 and, due to the rotatable adjustment between the plate 36 and the body 34, the chuck holder will also be rotated since it is supported entirely by the plate 36.

The holder 38 is formed from a plurality of parts which are spaced to provide an annular recess 39 in which bars 40 are adjustably mounted. These bars have arms 41 projecting therefrom into a central opening formed in the holder, the inner ends of the arms having rubber tips 42 projecting therefrom, these members engaging the edge of a lens blank 43 positioned in the holder. Suitable springs are provided for urging the arms 41 toward one another to frictionally clamp the lens blank therebetween to effect its retention in the holder. A lever 44 projects beyond the outer side edge of the holder to permit the fingers to be actuated in opposition to their springs to effect the release of the lens blank when it is desired to remove the same from the holder. The member 38 also has one or more projections 45 which the operator may grasp to effect the rotation of the holder in adjusting the lens 43 to determine the optical axis.

When the instrument is used, a lens is positioned in the holder and the operator applies one eye to the eye piece 6 to note the appearance of the cross lines on the target through the lens blank. If the cross lines appear to be broken at the edges of the lens blank, the holder is rotated until such lines appear to pass through the lens blank without interruption. The lens is then in proper position with regard to its optical axis. At this time, the operator adjusts knob 30 to raise or lower the holder until the segment 46 of the lens positioned in the holder is located the required distance below the central cross line on a protractor 47 supported by the carriage adjacent to the lens holder. This protractor is formed of glass or similar transparent material in order that the operator's vision of the target will not be obstructed in the axis finding operation.

To support the protractor, a bar 48 is secured at its ends to the upper portions of the guides 22, the intermediate portion of the bar projecting across the opening formed in the lens holder. At its central portion, the bar is offset as at 49 and the protractor is secured to this offset portion. The direction of offset is toward the arms 41 to position the protractor in close proximity to a lens blank held by the arms. After the segment of the bifocal lens blank has been located vertically with respect to the protractor, the second section 33 of the frame is moved toward the right or left to secure the "inset" of the segment.

This motion is secured through the adjustment of a second control knob 50 secured to one end of a screw 51 threadedly received by a boss 52 formed on the frame section 33. The screw is held against longitudinal movement by engagement of shoulders thereon with opposite sides of a lug 53 provided in connection with the first section 23 of the frame. Thus, when the knob 50 is turned to rotate the screw, the reaction from the engagement of the boss 52 therewith will cause the second section of the frame to move in the guideway 31. The operator may determine the extent of movement by comparing the position of the center of the bifocal segment which has been previously marked with transversely spaced gauge lines on the protractor.

When these adjustments have been completed, the marking device 18 is actuated to apply marks to the lens to indicate the longitudinal axis of the finished lens. The marks thus made are employed in locating the lens blank in a device used to cut the blank and give thereto its final shape. The mechanism used to cut the lens forms no part of this invention and is therefore not illustrated. After the lens blank has been cut, the edge is finished by the usual edging operation and the lens is then ready for mounting in a customary manner.

From the foregoing, it will be apparent that there has been provided an instrument by means of which bifocal lens blanks may be tested to determine the optical axes and centers after which the blanks may be adjusted to determine the longitudinal axes relative to the drop and inset of the reading segments and marks applied to indicate these axes. All of these operations may be performed without requiring the operator to remove the blanks from the instrument and the extent and direction of the movements are under the complete control of the operator. Through the use of this machine, an operator may obtain uniform results with a minimum expenditure of time and effort.

What I claim is:

1. In mechanism for finding and marking the axes of lenses, a carriage provided with vertical guides, a protractor stationarily mounted on said carriage, a frame section disposed for movement in said guides, said frame section having horizontal guide means, a second frame section disposed for movement in the guides on said first frame section, a lens chuck carrier mounted for rotative adjustment on said second frame section, said carrier serving to support a lens adjacent to said protractor, and means for imparting controlled movement to said frame sections to adjust a lens held by said carrier relative to said protractor in vertical and horizontal directions.

2. In mechanism for finding and marking the axes of lenses, means for locating the segments of bifocal lenses comprising a carriage having vertical guide means, a protractor stationarily mounted on said carriage, a frame section disposed for movement in said guide means, rack and pinion means on said carriage and frame section to effect adjustment of the latter relative to the former, horizontal guide means on said frame section, a second frame section disposed in the guide means on said first frame section, adjusting means on said frame sections to move the second section relative to the first, and lens holding means positioned for rotative adjustment on said second frame section, said means serving to support a lens adjacent to said protractor, movement of said frame sections serving to adjust a lens held by said holding means in vertical and horizontal directions relative to said protractor.

3. In segment-locating means for opthalmic lenses, a mounting bed, a carriage on said bed having vertical guides, a frame slidable on said guides, manually operated means for adjusting said frame relative to said guides, said frame being formed with horizontally disposed guides, a second frame supported on said first frame for vertical movement in unison therewith, manually operated means for moving said second frame relative to said first frame along said horizontal guide, a lens-carrying ring mounted in said second frame for rotation about the longitudinal axis of the ring, manually releasable means for maintaining an opthalmic lens in the center of said ring, and a graduated protractor supported stationarily by said carriage immediately to the rear of a lens supported in said ring and with the graduations of said protractor viewable through said lens, said protractor being formed from a transparent material.

GEORGE J. SHEEHY.